United States Patent [19]

Vanderhelst

[11] Patent Number: 4,849,873
[45] Date of Patent: Jul. 18, 1989

[54] ACTIVE SNUBBER FOR AN INVERTER

[75] Inventor: Peter W. Vanderhelst, Birmingham, Mich.

[73] Assignee: Medar, Inc., Farmington Hills, Mich.

[21] Appl. No.: 117,045

[22] Filed: Nov. 5, 1987

[51] Int. Cl.[4] .................................... H02H 7/122
[52] U.S. Cl. .................................... 363/55; 363/132; 363/136
[58] Field of Search .................. 363/55, 56, 58, 132, 363/136, 17, 27, 98

[56] References Cited

U.S. PATENT DOCUMENTS

| | | | |
|---|---|---|---|
| 3,286,155 | 11/1966 | Corey | 363/41 |
| 4,063,306 | 12/1977 | Perkins et al. | 363/17 |
| 4,403,269 | 9/1983 | Carroll | 363/56 |
| 4,502,085 | 2/2985 | Morrison et al. | 363/56 |
| 4,626,980 | 12/1986 | McGuire | 363/132 |
| 4,639,849 | 1/1987 | Noworolski et al. | 363/132 |

Primary Examiner—Patrick R. Salce
Assistant Examiner—Sterrett
Attorney, Agent, or Firm—Dale R. Small

[57] ABSTRACT

Active snubber structure and method for use with an electronic power inverter to reduce turn off losses in electronic switches in the power inverter. The snubber structure includes a resistor and a capacitor connected in series with each other and in parallel with the load on the power inverter and parallel, inverse connected silicon controlled rectifiers connected in parallel with the resistor for selectively shorting the resistor. In the method of use of the active snubber structure, electrical energy is stored in the capacitor connected in parallel with the load during on time of the inverter and the resistor is shorted immediately prior to the off time of the inverter whereby the capacitor charges substantially to the value of the source of direct current electrical energy during the on time of the inverter and on shorting of the resistor during off time of the inverter, the voltage across the load changes slowly so that the switches of the inverter can transition from on through a resistor like turn off stage, to completely off before there is appreciable voltage across them.

18 Claims, 3 Drawing Sheets

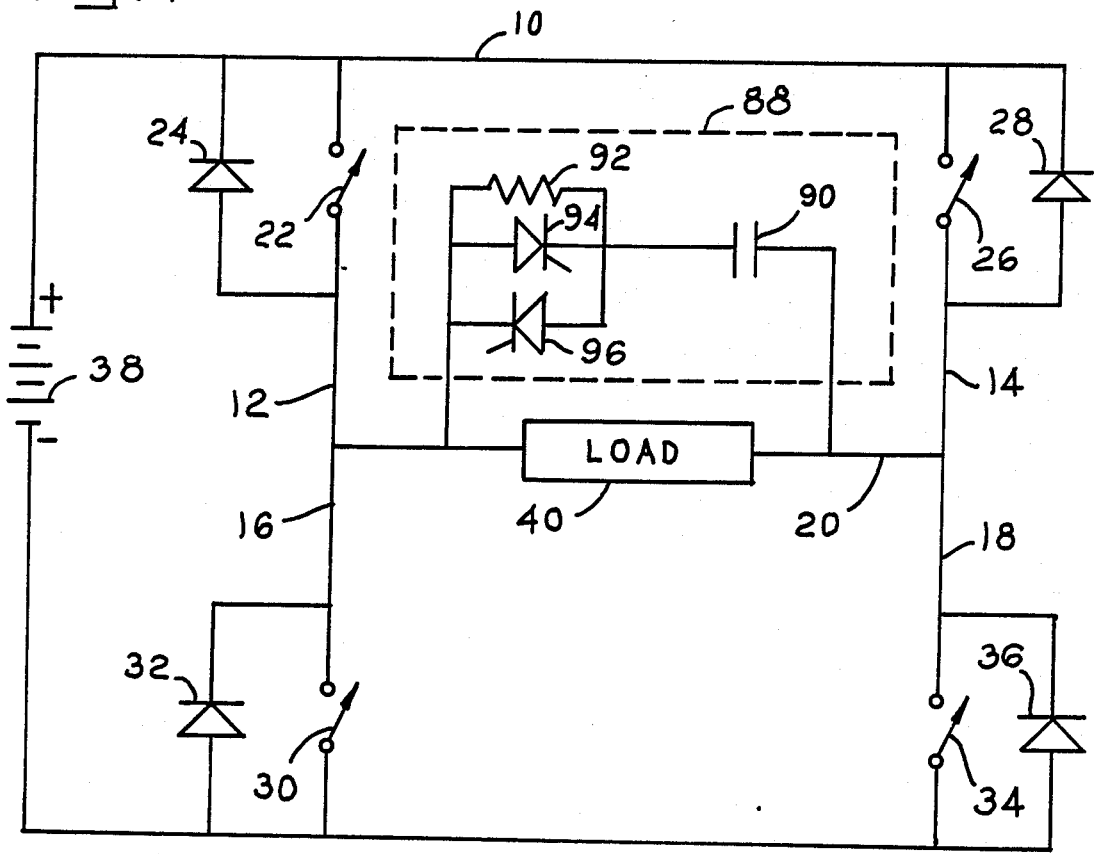

ACTIVE SNUBBER FOR AN INVERTER

BACKGROUND OF THE INVENTION

1. Field of the Invention

The invention relates to electronic power inverters for providing an alternating current source of electrical energy from a direct current source of electrical energy, and refers more specifically to an active snubber structure and method for use in conjunction with an electronic power inverter including electronic switches for limiting turn off losses in the electronic switches during operation of the inverter.

2. Description of the Prior Art

In the past, converting a direct current voltage into an alternating current voltage was accomplished by using a direct current motor to drive an alternating current generator at the correct speed to generate a desired voltage and frequency of alternating current electrical energy.

Electronic devices commonly called power inverters have been developed to accomplish the same function. Power inverters utilize a number of different electronic circuits.

Electronic power inverters have in common the use of electronic switches for switching the direct current energy supplied to a load on and off and for changing the polarity of the electrical energy applied across the load. The electronic switches utilized have inherent turn on and turn off energy losses due to their acting as variable resistors during turn on and turn off. The turn off time for the electronic switches utilized in power inverters is normally much larger than the turn on time so that most energy loss during switching of the electronic switches is during turn off time.

Accordingly, snubber circuits have been utilized in the past in conjunction with electronic power inverters for reducing switching losses during turn off of electronic switches in the power inverters. Such snubbing circuits as have been utilized in the past have been complicated, and therefore expensive to produce, and have potential for malfunction due to their complexity.

SUMMARY OF THE INVENTION

In accordance with the invention, there is provided an active snubber structure and method for reducing turn off switching losses in an electronic power inverter circuit wherein an electronic power inverter is provided between a source of direct current electrical energy and a load which electronic power inverter includes electronic switches.

The snubber structure of the invention includes a capacitor and a resistor connected in series with each other and in parallel across the load, and switch means connected in parallel with the resistor for selectively shorting the resistor.

The capacitor is sized to make the voltage across the load change slowly on shorting of the resistor and turning off of the electronic switches so that the electronic switches can transition from on, through a resistor like turn off stage to completely off before there is appreciable voltage across the electronic switches.

The resistor and capacitor are also sized so that their time constant is approximately one quarter of the minimum on time used in the inverter circuit.

In accordance with the method of the invention, during on time of the electronic switches, the snubber capacitor is allowed to charge through the snubber resistor to substantially the level of the direct current source of electrical energy. Immediately before opening the electronic switches in the inverter to provide inverter off time, the resistor is shorted so that on opening of the switches, the load current is shunted to the capacitor until the voltage across the parallel combination of the load and the capacitor has reversed polarity and reached the value of the direct current power supply. Accordingly, current flow through the electronic switches in the inverter during turn off time is substantially reduced, reducing the turn off losses of the electronic switches as desired.

BRIEF DESCRIPTION OF THE DRAWINGS

FIG. 4 is a schematic diagram of an electronic power inverter connected between a direct current power supply and a load, as shown in FIG. 1, and including active snubber structure constructed in accordance with the invention for practicing the method of the invention in combination therewith.

DESCRIPTION OF THE PREFERRED EMBODIMENT

Figure 1:
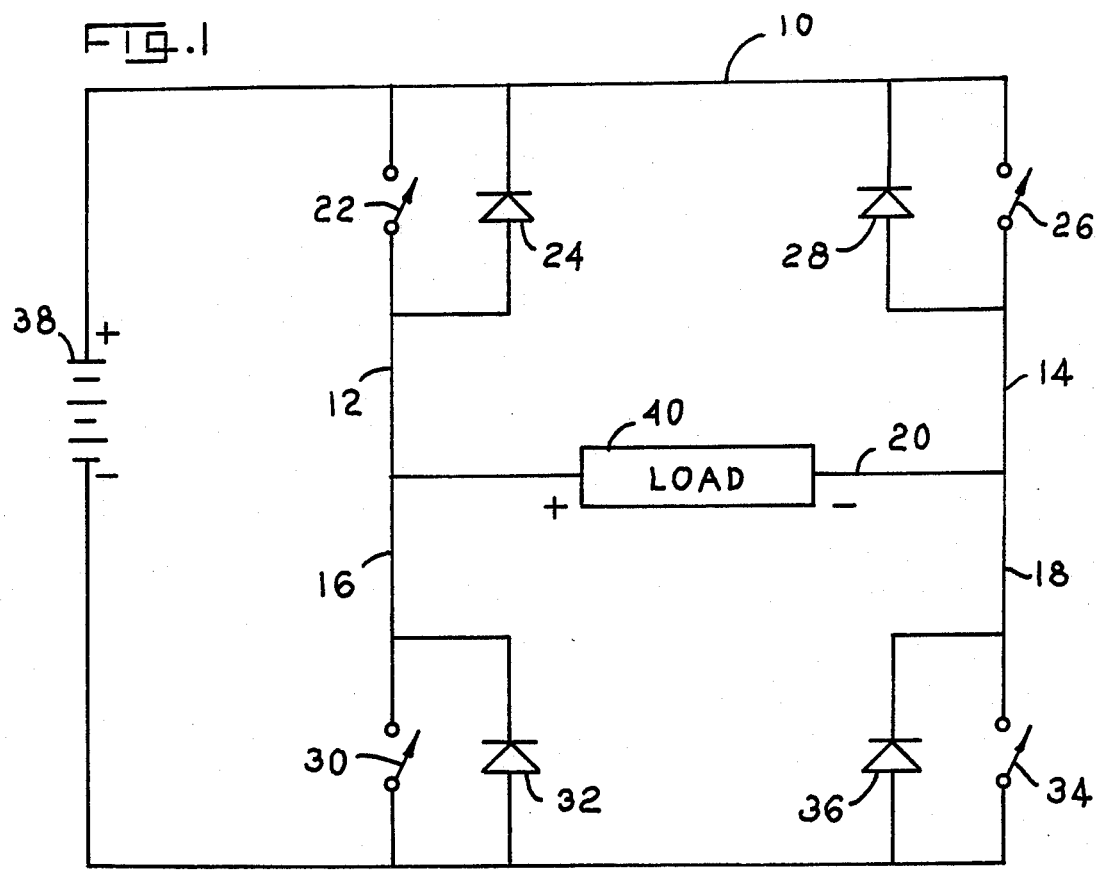
FIG. 1 is a schematic representation of a prior art electronic power inverter in circuit between a direct current power supply and a load.

As indicated above, electronic power inverters may take many forms. One of the more common electronic power inverter circuits, called an H bridge, is shown in FIG. 1. The electronic power inverter 10 of FIG. 1 includes a first upper branch 12, a second upper branch 14, a first lower branch 16 and a second lower branch 18. The electronic power inverter 10 further includes a central portion 20.

A first electronic switch 22 in parallel with a first diode 24, is provided in the first upper branch 12 of the inverter 10. Further, as shown in FIG. 1, second, third and fourth electronic switch and diode pairs 26 and 28, 30 and 32, and 34 and 36, are provided in the other upper branch 14, the first lower branch 16 and the second lower branch 18 of the electronic power inverter 10.

The direct current power supply 38, shown in FIG. 1, is a current wise bidirectional direct current power supply, as for example a storage battery. With such power supplies, normally current flows from the positive terminal of the direct current power supply through whatever load it is connected to, to the negative terminal. If, however, another power source of higher voltage is connected in parallel with the original power source, the current direction is reversed and energy flows into the original direct current power source instead of out of it.

The load 40, as shown in FIG. 1, is a combination of resistance and inductance, such as might be encountered in a load which involves a transformer.

In operation of the prior art electronic power inverter shown in FIG. 1, one diagonally opposite pair of switches such as 22 and 34, are closed while the other pair of electronic switches, that is 26 and 30, remain open. After an appropriate interval, the pair of switches that is closed is opened and the other pair, that is first open, is closed. The two diagonally opposite pairs of switches operate in this manner, alternately opening and closing to generate a desired alternating current electrical energy output having a desired frequency.

Because of the practicalities of electronic switching devices and to control load current in electronic power inverters, as shown in FIG. 1, there exists a time interval between when one pair of switches is open and the other pair is closed. During this interval, no switches are closed. Appropriately, this time interval is called off time.

If off time is increased by a certain amount and on time is decreased by the same amount, the alternating current output frequency remains the same, but the load current is decreased because the load spends a lesser proportion of time connected to the direct current power supply. This variation of on and off time is commonly used to control current through the load to a desired value.

To provide an explanation of the operation of the diodes 24, 28, 32 and 36 in the electronic power inverter circuit of FIG. 1, the events of a positive going (with respect to the load) half cycle of the alternating current output voltage will be considered.

At the beginning of the positive going half cycle, switches 22 and 34 are closed so that the positive end of the load is connected to the positive side of the direct current power supply 38 and the other end of the load is connected to the negative side of the direct current power supply 38. During the time that switches 22 and 34 are closed, current builds up in the load 40.

Because the load 40 has an inductive component, the current through it cannot instantaneously go to zero when switches 22 and 34 are opened. The inductive component of the load 40 forces the load current to remain flowing in the same direction on opening of the switches 22 and 24. Given the direction of the current and the fact that all of the switches 22, 34, and 26 and 30 are open at this time, the only path available for the load current is through diodes 28 and 32, back through the direct current power supply 38. At the instant the switches 22 and 34 are turned off, the voltage across the load 40 reverses polarity, diodes 28 and 32 conduct and the energy stored in the inductive component of the load 40 is fed back into the direct current power supply 38.

By analogy, the same things happen on a negative half cycle of the energy through the load 40, except that the polarities are reversed and the switches 26 and 30 and diodes 24 and 36 are involved.

The purpose of the diodes 24, 28, 32 and 36 is in the power inverter 10, shown in FIG. 1, to provide a path for the energy stored in the inductance of the load 40 to get back into the direct current power supply 38. If it were not for the diodes 24, 28, 32 and 36, the voltage across the load 40 could go very high at turn off time and destroy the switches. With the diodes 24, 28, 32 and 36 in the cirucuit of the power inverter 10, the voltage across the load 40 is limited to whatever the direct current power supply voltage is at that instant.

The above discussion of the operation of the power inverter illustrated in FIG. 1 assumes ideal components, that is infinitely fast switching speed and no voltage drops through switching components. In the real world, using real electronic switching devices, this is definitely not the case.

In particular, electronic switching devices require a finite amount of time to turn on and off. During this switching time, they behave like resistors and if voltages and currents are high, the amount of energy dissipated in this resistance can be quite large. The energy dissipated in electronic switching devices as a result of their non-zero switching time, is called the switching loss.

Normally, the types of electronic switches used for power inverters turn off more slowly than they turn on. A typical switch might require 20 microseconds to turn off, but only 2 microseconds to turn on. Also, since the loads on power inverters are most often inductive in nature, the amount of load current at turn off time is much greater than at turn on time.

As a result of the above indicated factors, switching losses at turn off of switches utilized in power inverters of the past are much larger than at turn on and prior schemes to reduce switching losses have concentrated on reducing turn off losses. The circuit commonly used to reduce the turn off losses of large electronic switches is shown in conjunction with a switch 44 in FIG. 2.

Figure 2:
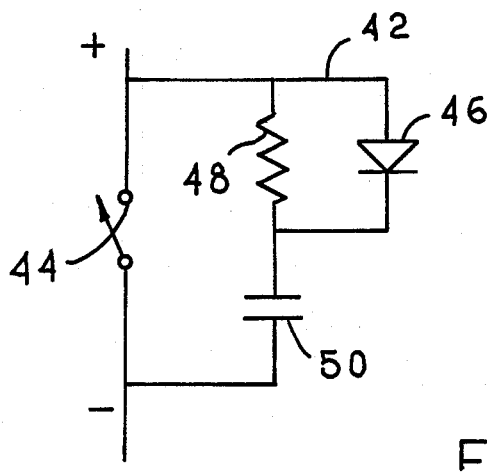
FIG. 2 is a schematic diagram of an electronic switch with a known snubber circuit in combination therewith.

In consideration of the snubber circuit 42 illustrated in FIG. 2, there will be an assumption that the switch 44 has a predetermined voltage having the polarity shown across it. Because of the polarity of the diode 46 and the presence of the resistor 48 in the circuit 42, the capacitor 50 will be charged to the same voltage as that across the switch.

When the switch 44 is turned on, that is closed as shown in FIG. 2, the capacitor 50 is discharged through the resistor 48. The resistance of resistor 48 is chosen so that when the switch 44 is operated in an inverter circuit as shown in FIG. 1, at its minimum on time, enough current flows through the resistor to almost completely discharge the capacitor 50.

Typically, resistor 48 is selected so that its time constant with capacitor 50 is about one quarter of the minimum switch on time. Very low values of the resistor 48 are avoided, because at switch turn on, the current through resistor 48 is in addition to the load current, which tends to increase switching losses at turn on.

At switch turn off time, the voltage across the switch 44 is limited by the diode 46 and the capacitor 50. Essentially, as the switch 44 shuts off, the current through it is momentarily diverted by the diode 46 to charge the capacitor 50. This results in the voltage across the switch 44 rising more slowly.

The capacitor 50 is sized so that it is large enough to make the voltage rise across the switch 44 slow enough to give the switch time enough to become completely off before the voltage across it rises substantially. As a result of the slower voltage rise, the switch 44 passes through a stage of being resistor like before any high voltage is present. This results in lower power dissipation in the switch.

It should be recognized at this point that the total system switching losses are not reduced by the use of a snubber circuit 42, as shown in FIG. 2. In fact, it can be substantially increased. What the snubber circuit 42 does is to transfer the energy associated with the switching losses into the capacitor 50 at turn off and then dissipate that energy into resistor 48 the next time the switch 44 is turned on. The effect of this is that the switching losses are dissipated into the resistor 48 rather than the switch 44. From an economic standpoint, this is a desirable tradeoff because the cost of resistors to dissipate a given amount of energy is much less than the cost of electronic switches for the same purpose.

Figure 3:
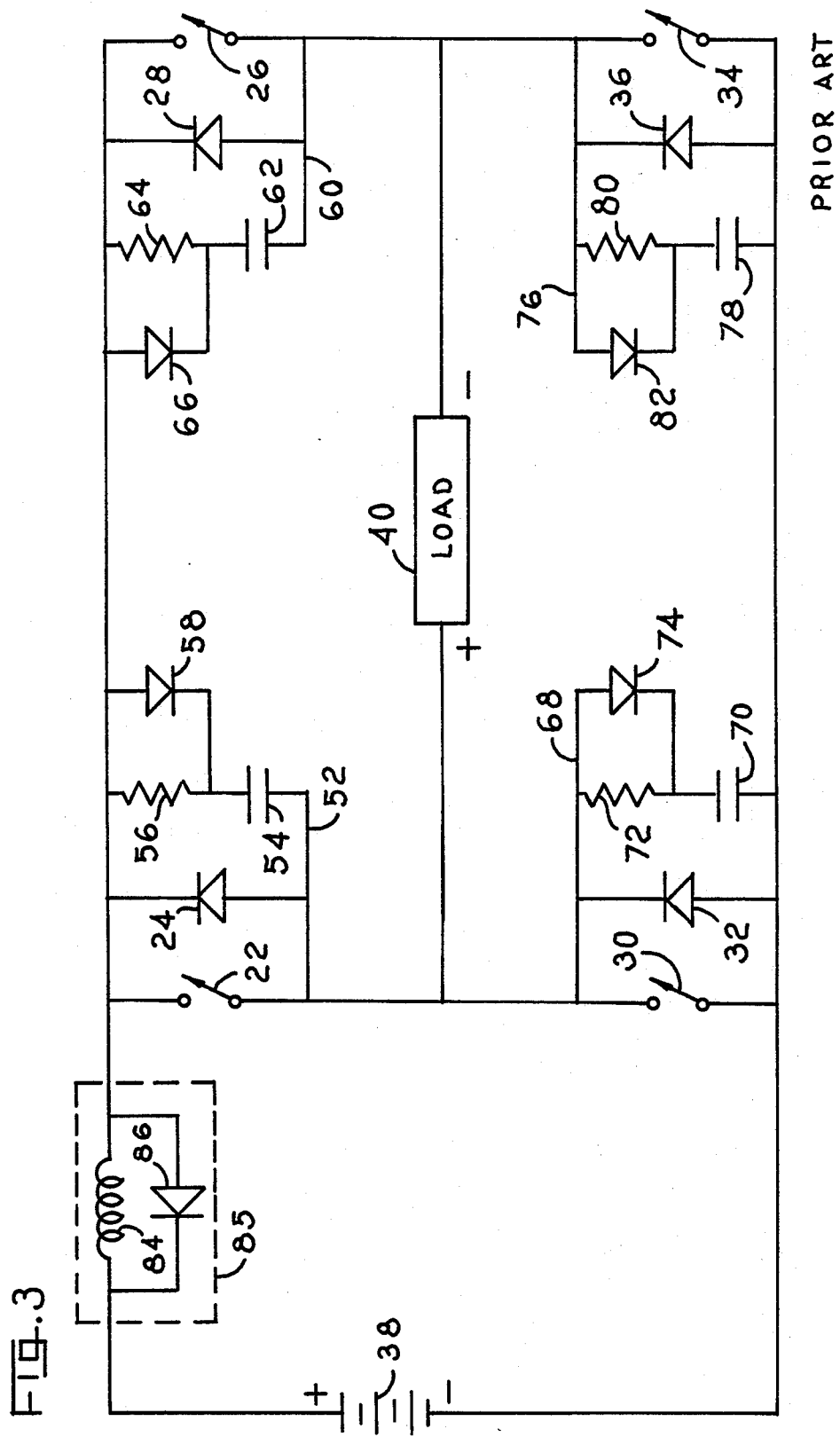
FIG. 3 is a schematic diagram showing the electronic power inverter of FIG. 1 with snubber circuits as shown in FIG. 2 in conjunction with the electronic switches therein, and including current limiting structure in series between the source of direct current electrical energy and the electronic power inverter necessary in conjunction with the snubber circuits in the circuit shown in FIG. 3, all in accordance with the prior art.

When snubber circuits 42, such as shown in FIG. 2, are applied to an H bridge power inverter circuit as shown in FIG. 2, they present a particular problem as will be considered in conjunction with FIG. 3. The H bridge inverter shown in FIG. 3 is connected to a direct current power supply and to an inductive load. The reference numerals shown in FIG. 3 are the same as those utilized in FIG. 1 for the same elements. A separate snubber circuit 42 as shown in FIG. 2 is provided across each of the switches 22, 26, 30 and 34, shown in FIG. 3. On the FIG. 3 embodiment of the prior art, each snubber circuit is provided with new reference numerals for the capacitor, resistor and diode elements thereof.

Thus, as shown in FIG. 3, the snubber circuit 52 associated with switch 22 includes the capacitor 54, resistor 56 and diode 58, the snubber circuit 60 associated with switch 26 includes the capacitor 62, the resistor 64 and diode 66, the snubber circuit 68 associated with the switch 30 includes the capacitor 70, resistor 72 and diode 74 while the snubber circuit 76 associated with the switch 34 in FIG. 3 includes the capacitor 78, resistor 80 and diode 82.

Still referring to FIG. 3, with switches 22 and 34 closed, or turned on, there will be a very low impedance path from the direct current power supply 38 through switch 22 through diode 74, which is the snubber diode associated with switch 30. to capacitor 70. There will be a similar path through switch 34, capacitor 62 and diode 66. These low impedance paths could result in an extremely high current at switch turn on, easily sufficient to destroy any practical switching devices.

In the past, the usual way to deal with this problem of low impedance paths at turn on in H bridge power inverters having snubbing circuits as shown in conjunction therewith, is to add an inductor 84 in series with the direct current power supply 38, as shown in FIG. 3, to limit the instantaneous inrush of current into the snubber capacitors. However, since at turn off current must quickly reverse through the inductor 84 in the circuit as shown in FIG. 3, a diode 86 must be placed in parallel with the inductor 84 to allow the quick reversal of current. The current limiting inductor 84 and diode 86 make up the current limiting circuit 85, shown in FIG. 3.

As can be seen on consideration of FIG. 3, and in light of the above discussion, using snubber circuits 52, 60, 68 and 76 in an electronic inverter adds considerably to the complexity of the overall power inverter circuit. Because of the nature of the components required in the snubbing circuits and current limiting circuits as shown in FIG. 3, both cost and size of the overall inverter circuit is increased. Further, reliability of the overall circuit is decreased because the failure of any of the snubber components will cause extra stress on the switches, thus shortening their operational life. In extreme cases, failure of a snubber component may cause immediate failure of a switch.

With the above in mind, an active snubber circuit 88 is added to the circuit of FIG. 1 in accordance with the structure and method of the invention, as shown in FIG. 4. The elements of the circuit of FIG. 1, including the H bridge power inverter 10, the direct current power supply 38 and the load 40 as shown in FIG. 4, are given the same reference numerals. The active snubber circuit 88 of the invention is provided with new reference numerals.

As shown in FIG. 4, the snubber circuit 88 of the invention includes a capacitor 90, a resistor 92 and silicon controlled rectifiers 94 and 96.

The capacitor 90 and resistor 92 are connected in series with each other and are connected in parallel with the load 40, as shown in FIG. 4. Silicon controlled rectifiers 94 and 96 are connected in inverse, parallel relation to each other and are in parallel with the resistor 92.

In the operation of the active snubber circuit 88 of the invention as shown in FIG. 4, the events of a positive (as seen by the load) half cycle of the inverter 10 will be described.

At the start of the half cycle, switches 22 and 36 are turned on. Current starts flowing through the load 40 and the snubber capacitor 90 is charged through resistor 92. The snubber resistor 92 is sized so that even at the minimum on time in normal operation, the voltage across capacitor 90 will rise to nerely the load voltage. During this time, both of the silicon controlled rectifiers are off.

Immediately before switches 22 and 34 are opened, the silicon controlled rectifier 96 is triggered on by separate gating circuit, not shown, which generates a short duration triggering pulse. As switches 22 and 34 are switched off, the load current is temporarily shunted through the silicon controlled rectifier 96, which is now conducting, to charge the capacitor 90. In other words, the silicon controlled rectifier is used to connect the capacitor 90 directly across the load 40 at the instant of turn off.

The load current is shunted into the capacitor 90 until the voltage across the parallel combination of the load and capacitor 90 has reversed polarity and reached the level of the direct current power supply 38. At this time, the diodes 28 and 32 conduct to shunt the current back into the direct current power supply 38. As soon as the load current is fully flowing through the diodes 28 and 32, the silicon controlled rectifier 96 is shut off due to lack of sustaining current.

The snubber capacitor 90 is sized to make the voltage across the load change slowly so that the switches can transition from on, through their resistor like turn off stage, to completely off before there is appreciable voltage across them.

The snubber resistor 92, as shown in FIG. 4, is selected after the capacitor 90 is selected so that the time constant of the resistor 92 capacitor 90 circuit is about one quarter of the minimum on time used in the inverter 10.

On negative path cycles (from the loads stand point), the operation is identical to that described above except that the polarities are opposite and the participating components are switches 26 and 30, silicon controlled retifier 94 and diodes 24 and 36.

Thus, there is provided an active snubber stricture and method which is considerably simpler than the prior art structures and methods, as shown in FIGS. 1 through 3, utilized to reduce turn off losses in electronic switches used in power inverter circuits, and the snubber structure and method of the invention does not require current limiting structure in series with the direct current power supply 38.

While one embodiment of the present invention had been considered in detail, it will be understood that other embodiments and modifications thereof are contemplated. It is the intention to include all embodiments and modifications as are defined by the appended claims within the scope of the invention.

I claim:

1. A source of direct current electrical energy, a load, a power inverter having on times and including electronic switches connected between the source of direct current electrical energy and the load for supplying alternating current electrical energy through the load from the direct current source of electrical energy and active snubber structure connected directly across the load in parallel therewith for reducing turn off losses in the electronic switches in the power inverter comprising electronic storage means and impedance means connected in series with each other and in parallel with the load and means connected across the impedance for selectively shorting the impedance means.

2. Structure as set forth in claim 1 wherein the inverter is an H bridge inverter having four separate branches, each having an outer end and a central portion including separate diodes in parallel with each electronic switch and in series in each branch, and wherein the load is connected in the central portion of the inverter and the source of direct current electrical energy is connected to the outer ends of the separate branches of the inverter.

3. Structure as set forth in claim 1 wherein the electronic storage means is a capacitor.

4. Structure as set forth in claim 3 wherein the capacitor is sized to cause the voltage across the load to change slowly so that the switches in the power inverter can transition from on, through a resistor like turn off stage, to substantially completely off before there is appreciable voltage across them.

5. Structure as set forth in claim 1 wherein the impedance means is a resistor.

6. Structure as set forth in claim 1 wherein the electronic storage means and the impedance means are a capacitor and resistor and the capacitor and resistor are sized to provide a time constant which is about one quarter of the minimum on time used in the inverter.

7. Structure as set forth in claim 1 wherein the means for selectively shorting the impedance means is switch means connected in parallel with the impedance means.

8. Structure as set forth in claim 7 wherein the switch means is electronic.

9. Structure as set forth in claim 8 wherein the electronic switch means is at least one silicon controlled rectifier.

10. Structure as set forth in claim 9 wherein the electronic switch means is a pair of silicon controlled rectifiers connected in inverse, parallel across the impedance means.

11. In combination, an H bridge power inverter including a central portion, an upper branch at each end of the central portion, a lower branch at each end of the central portion, a first electronic switch and diode in parallel with each other and in series in a first of the upper branches of the inverter, a second electronic switch and diode in parallel with each other and in series in the second upper branch of the inverter, a third electronic switch and diode in parallel with each other and in series in a first of the lower branches of the inverter and a fourth electronic switch and diode in parallel with each other and in series in the second of the lower branches of the inverter, a direct current source of electrical energy connected across the power inverter with the upper branches of the inverter connected to one polarity of the electrical energy from the direct current source of electrical energy and with the lower branches of the inverter connected to the other polarity of the direct current source of electrical energy, a load connected in series in the central portion of the inverter and active snubber structure connected in parallel with the load comprising a capacitor and resistor in series with each other and connected across the load in parallel therewith and electronic switch means connected across the resistance for selectively sorting the resistance.

12. Structure as set forth in claim 11 wherein the capacitor and resistor are sized to provide a time constant which is about one quarter of the minimum on time used in the inverter.

13. Structure as set forth in claim 11 wherein the capacitor is sized to cause the voltage across the load to change slowly so that the switches in the power inverter can transition from on, through a resistor like turn-off stage, to substantially completely off before there is appreciable voltage across them.

14. Structure as set forth in claim 13 wherein the capacitor and resistor are sized to provide a time constant which is about one quarter of the minimum on time used in the inverter.

15. A method of reducing switching losses in a power inverter connected between a source of direct current electrical energy and a load, comprising storing electrical energy during inverter on time in a capacitor connected in parallel with the load during on time of the inverter through a resistor in series with the capacitor and discharging the stored energy directly through the load during the switching time of the inverter.

16. The method as set forth in claim 15 and further including sizing the capacitor to cause the voltage across the load to change slowly so that electronic switches in the power inverter can transition from on, through a resistor like turn off stage, to substantially completely off before there is appreciable voltage across them.

17. The method as set forth in claim 16 and further including sizing the resistor and capacitor to provide a time constant which is about one quarter of the minimum on time used in the inverter.

18. The method as set forth in claim 15 wherein the stored electrical energy is discharged through the load by shorting the resistor during switching time of the inverter.

* * * * *